No. 745,906. PATENTED DEC. 1, 1903.
E. C. PRICE.
BEVEL SIDING HEAD.
APPLICATION FILED AUG. 4, 1903.
NO MODEL.

WITNESSES:
Paul Hunter
C. R. Ferguson

INVENTOR
Eugene C. Price
BY
Munn
ATTORNEYS

THE NORRIS PETERS CO., PHOTO-LITHO., WASHINGTON, D. C.

No. 745,906. Patented December 1, 1903.

UNITED STATES PATENT OFFICE.

EUGENE CRANDALL PRICE, OF EUREKA, CALIFORNIA.

BEVEL-SIDING HEAD.

SPECIFICATION forming part of Letters Patent No. 745,906, dated December 1, 1903.

Application filed August 4, 1903. Serial No. 168,216. (No model.)

*To all whom it may concern:*

Be it known that I, EUGENE CRANDALL PRICE, a citizen of the United States, and a resident of Eureka, in the county of Humboldt and State of California, have invented a new and Improved Bevel-Siding Head, of which the following is a full, clear, and exact description.

This invention relates to improvements in bevel-siding heads or cutting attachments for machines for forming bevel-siding, beaded ceiling, flooring, battens, and certain moldings, an object being to provide a bevel-siding head of novel construction and so arranged as to be readily secured to the side spindle of the machine.

I will describe a bevel-siding head embodying my invention and then point out the novel features in the appended claims.

Reference is to be had to the accompanying drawings, forming a part of this specification, in which similar characters of reference indicate corresponding parts in all the figures.

Figure 1:
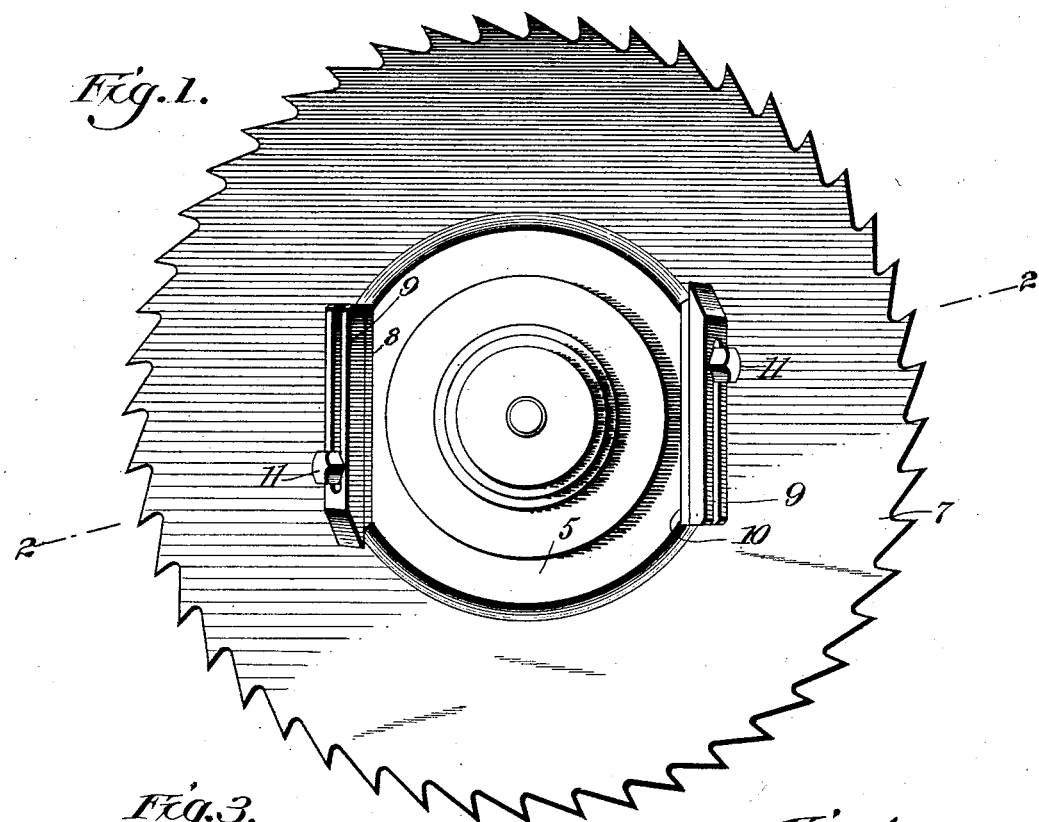
Figure 3:
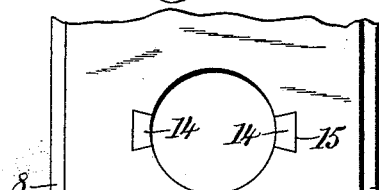
Figure 2:
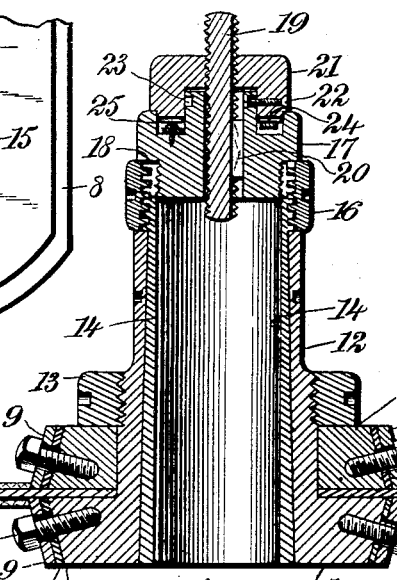
Figure 4:
Figure 5:

Figure 1 is a plan view of a bevel-siding head embodying my invention. Fig. 2 is a section on the line 2 2 of Fig. 1. Fig. 3 is a fragmentary view showing the under side of the head members. Fig. 4 is a plan view of a stop-pawl employed, and Fig. 5 is an edge view thereof.

Referring to the drawings, 5 6 designate the two heads between which the saw 7 is clamped, the head 5 being at the under side and the head 6 engaging on the upper side. At the opposite sides each head is provided with a surface 8, which is inclined transversely. On each of these heads is secured a cutter 9, and between each cutter and the head is arranged a chip-breaking blade 10. The cutter and blade are longitudinally slotted, and they are held in place by means of a screw 11, which passes through said slots in the head. By this means the cutter and blade may be regulated lengthwise.

The head 5 has a tubular extension or body 12, which adjacent to the head 6 is screw-threaded to engage a clamping-nut 13, which presses against the head 6 and firmly clamps it against the saw. This nut 13, as here shown, is provided with recesses to receive a spanner. The tubular body portion 12 is designed to receive the side spindle of a machine, which of course passes through the head 5, and as a means for clamping the device firmly to the spindle I provide clamping-bars 14, which are arranged to move longitudinally in channels formed in the inner surface of the body and head. These channels 15 have undercut side walls, and they gradually diminish in depth from the lower to the upper end, and the clamping-bars are correspondingly shaped. The upper ends of these bars project beyond the end of the body 12, and these projected ends are screw-threaded to engage the interior thread of a collar 16, which is provided with recesses to receive a spanner, and this collar bears upon the end of the body 12.

The body 12 at its upper end has an interior screw-thread to receive an exterior thread of a tubular plug 17, the outwardly-extended annular portion 18 of which bears upon the upper side of the collar 16, and extended through this plug 17 is a screw 19, designed to engage against the upper end of the spindle, so as to adjust the heading device on the spindle. To prevent the screw 19 from turning, it is longitudinally channeled to receive a block 20, seated in a channel in the plug 17. This screw 19 is adjusted longitudinally by means of an interiorly-threaded cap 21, which is held in engagement with the plug and adapted to rotate thereon by means of a screw 22, passing through the cap and engaging in an annular channel 23 in the central upwardly-extended portion of the plug. The lower side of the cap is provided with an annular row of teeth 24, designed to be engaged by the upwardly-turned free end of a spiral spring-pawl 25, arranged in a channel formed in the upper end of the plug, and the said pawl is secured at one end to said plug. This pawl, while permitting movement of the cap 21 while pressure is applied to it, will prevent its accidental movement when the machine is in operation.

In clamping the device to a spindle it is obvious that by turning the collar 16 the bars 14 will be moved lengthwise and moved slightly inward against the spindle.

While I have shown cutters having straight edges, it is obvious that other forms of cutters may be employed, depending upon the work to be done.

In the operation it is obvious that as the saw cuts through a board the cutters will engage with the edges at the upper and lower sides of the saw and cause the bevel of the same. The heads are to be placed on the spindles at the sides of the machine, which should be diagonally opposite an incline to give the required bevel to the finished material. Thus the lumber will be split, making two pieces immediately behind the saws.

Having thus described my invention, I claim as new and desire to secure by Letters Patent—

1. A bevel-siding head comprising a tubular body adapted to engage with a spindle, an outwardly-extended annular flange on the lower end of the body for engaging with the under side of a saw, a collar surrounding the body and engaging with the upper side of the saw, cutters arranged on opposite sides of said flange and collar, and means for clamping the head to a spindle.

2. A bevel-siding head comprising a tubular body having a portion at its lower end for engaging against the under side of a saw, the said portion having straight parts on opposite sides, cutters adjustable lengthwise on said straight sides, a collar surrounding the body and engaging with the upper side of the saw, the said collar having straight portions on its opposite sides, cutters adjustable on said straight portions, a clamping-nut engaging with the collar and having screw-thread engagement with the tubular body, and means for clamping the head to the spindle.

3. A bevel-siding head comprising a tubular body, the said body having longitudinal channels in its inner side, the side walls of said channels being undercut and the said channels gradually diminishing in depth from one end to the other, clamping-bars movable in said channels and corresponding in shape thereto, the said bars having threaded ends extended beyond the ends of the tubular body, an interiorly-threaded collar engaging with said threads and also engaging upon the end of the body, and a plug engaging with said collar.

4. A bevel-siding head comprising a tubular body, cutting devices carried by said body, clamping devices arranged in the body, a tubular plug having screw-thread engagement with the outer end of the body, a screw passing through said plug for engaging with a spindle, means for holding said screw from rotary movement in the plug, an interiorly-threaded cap engaging with said screw, and means for preventing accidental movement of said cap.

5. A bevel-cutting head comprising a tubular body adapted to receive a spindle, cutting devices carried by said body, a tubular plug engaging in the outer end of said body, the said plug having an annular channel in its outer side, a screw fastened through said plug, means for preventing rotary movement of said screw, a cap mounted to rotate on the plug, but held from lengthwise movement thereof, the said cap being provided with an interior screw-thread for engaging said screw and also provided with teeth on its inner or under side, and a spirally-disposed pawl arranged in the channel of the plug and engaging with said teeth.

In testimony whereof I have signed my name to this specification in the presence of two subscribing witnesses.

EUGENE CRANDALL PRICE.

Witnesses:
CHAS. K. CADMAN,
H. L. WALDEN.